United States Patent [19]

Martin

[11] 4,418,582

[45] Dec. 6, 1983

[54] NO-LASH TELESCOPING STEERING SHAFT

[75] Inventor: Michael D. Martin, Jeffersonville, Ind.

[73] Assignee: The Bendix Corporation, Southfield, Mich.

[21] Appl. No.: 270,448

[22] Filed: Jun. 4, 1981

[51] Int. Cl.³ ............................................. B62D 1/18
[52] U.S. Cl. ...................................... 74/493; 74/531; 403/374
[58] Field of Search .................. 74/493, 531; 280/278, 280/279, 775; 403/374

[56] References Cited

U.S. PATENT DOCUMENTS

| 3,434,368 | 3/1969 | Runkle | 74/493 |
| 3,791,223 | 2/1974 | Treichel et al. | 74/493 |
| 3,874,701 | 4/1975 | Soong | 403/374 X |
| 4,113,395 | 9/1978 | Pawsat et al. | 280/279 X |

FOREIGN PATENT DOCUMENTS

| 55-156766 | 12/1980 | Japan | 74/493 |
| 616126 | 1/1949 | United Kingdom | 403/374 |

*Primary Examiner*—Allan D. Herrmann
*Attorney, Agent, or Firm*—Paul David Schoenle; Ken C. Decker

[57] ABSTRACT

A no-lash telescoping steering shaft (10) comprises first and second telescopically arranged parts (12, 18) which are configured to transmit torque therebetween. The first and second parts carry an axially and radially movable locking piece (68) engaging the first and second parts at points which are axially spaced apart. The locking piece is coupled for axial movement with the inner of the two parts and frictionally engages the outer part to prevent relative axial movement thereof. Because the locking piece engages the first and second parts at axially spaced points, it creates a moment therebetween. The moment opposes side-to-side relative movement of the two parts in a first axial plane. The moment also urges cooperating surface (86, 88) of the two parts into engagement. The cooperating surfaces resist side-to-side relative movement of the two parts in a second axial plane which is substantially perpendicular to the first plane and also eliminate rotational lash from the steering shaft.

10 Claims, 4 Drawing Figures

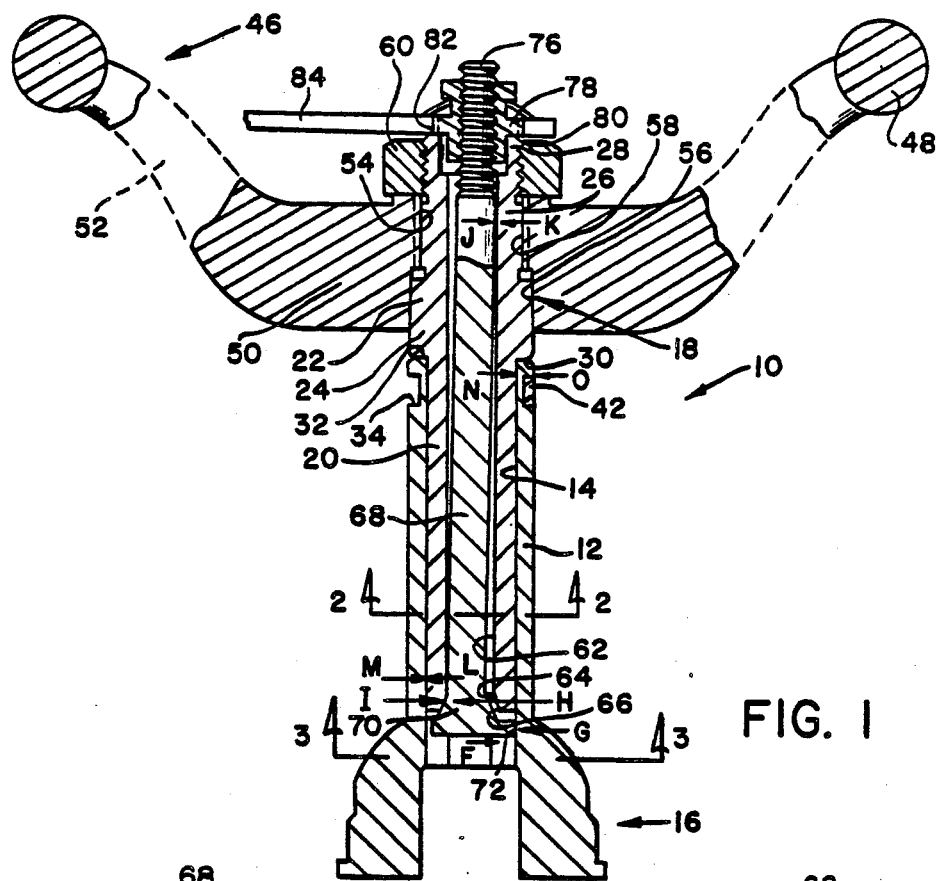
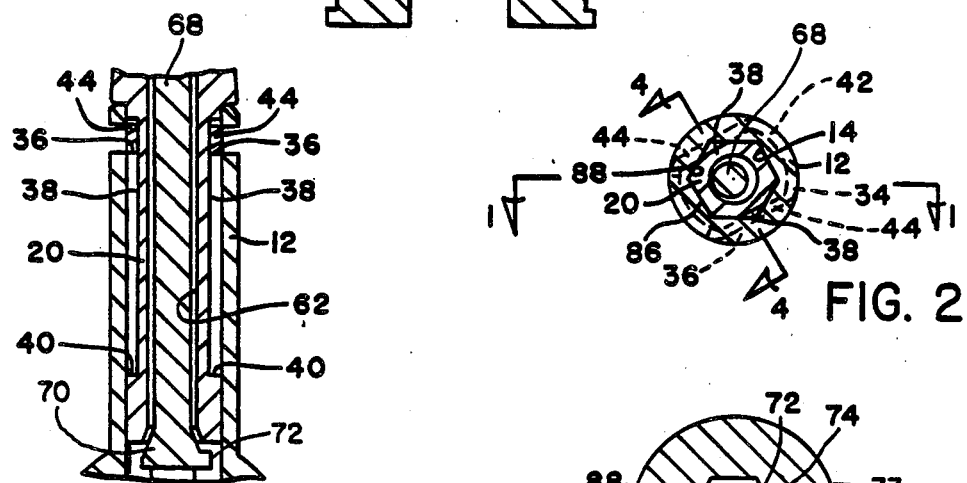
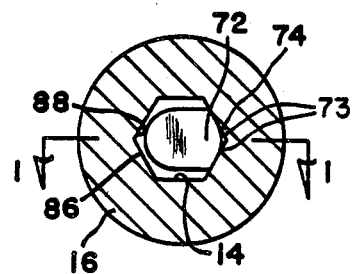

NO-LASH TELESCOPING STEERING SHAFT

The invention relates to a no-lash telescoping steering shaft. More particularly, the invention relates to a steering shaft having an elongate first part defining an axially extending bore therein. The axially extending bore is polygonal in transverse cross section. A second part of the steering shaft defines an elongate portion which is slidably received in the axially extending bore of the first part. The elongate portion of the second part defines an outer surface which is polygonal in transverse cross section and which substantially coincides with the polygonal bore of the first part. Consequently, the first and second parts are coupled for rotation in unison. Additionally, the first and second parts are relatively movable axially because the elongate portion of the second part is reciprocably received within the axially extending bore of the first part.

In order to prevent unwanted relative axial movement of the two shaft parts, the second part defines an axially extending through bore. The through bore defines a tapered or conical bore section tapering outwardly toward a bore opening on the elongate portion of the second shaft part within the first shaft part. An elongate locking part is movably received in the through bore of the second shaft part. The elongate locking part includes a tapered or conical portion which is received in the conical bore section of the through bore. The conical portion defines an axially and radially extending projection defining a radially outer surface which substantially coincides with and slidably engages a portion of the axially extending polygonal bore of the first shaft part. Because of the engagement of the radially extending projection with the polygonal bore, the axis of the conical portion of the locking part is displaced from the axis of the through bore. As a result, the conical portion slidably engages the conical section of the through bore diametrically oppositely from the radially extending projection. The engagement of the conical portion of the locking part with the conical section of the through bore is also spaced axially from the engagement of the radially extending projection with the polygonal bore. At its end opposite from the conical portion, the elongate locking part extends from the through bore of the second shaft part and defines a threaded portion. A nut is threadably received on the threaded portion of the locking part and is engageable with the second shaft part. The nut carries a lever which is drivingly coupled thereto. When the nut is rotated by the lever the elongate locking part is moved axially relative to the second shaft part. If the nut is rotated to draw the conical portion of the locking part into the conical section of the through bore, the radially extending projection is forced into frictional engagement with the polygonal bore of the first shaft part to lock the first and second shaft parts together and prevent relative axial movement thereof.

Additionally, because the engagement of the radially extending projection with the polygonal bore is axially spaced from the engagement of the conical portion of the locking part with the conical section of the through bore, a torque or moment is created between the first and second shaft parts which prevents transverse or side-to-side freedom of movement of the first and second shaft parts in a first axial plane. The first axial plane is defined by the axis of the second shaft part and a point of engagement of the conical portion of the locking part with the conical throughbore section.

Further, the radially extending projection of the locking part is oriented with respect to the polygonal bore of the first shaft part so that the moment developed between the two shaft parts, as explained supra, forces V-shaped external surfaces of the second shaft part into engagement with V-shaped internal surfaces defined in the polygonal bore of the first shaft part. Because of the cooperation of V-shaped external surfaces with V-shaped internal surfaces, the first and second shaft parts are substantially prevented from transverse or side-to-side relative movement in a second axial plane which is perpendicular to the first axial plane defined supra. The cooperation of the V-shaped surfaces also eliminates relative rotational freedom, or lash, of the first and second shaft parts when the first and second shaft parts are locked together.

A telescoping steering shaft, when incorporated into the steering column of an automotive vehicle, makes it possible for the operator of the vehicle to move the steering wheel axially with respect to the steering column.

Most automotive vehicles are provided with an adjustable seat so that the driver can obtain a comfortable position with respect to the control pedals of the vehicle, as determined by the length of the driver's legs. However, if the steering column can not also be adjusted, the position of the steering wheel with respect to the pedals is, more likely than not, unsatisfactory. Thus, a driver with long legs, after moving the seat rearwardly, may find the steering wheel too far away for comfort. On the other hand, a short-legged driver, after moving the seat to a forward position, may find that the steering wheel touches his body.

Accordingly, it is an object of this invention to provide a steering shaft which provides for axial movement of the steering wheel of an automotive vehicle.

Another object of this invention is to provide a steering shaft which, when locked to prevent axial movement of the steering wheel, also eliminates lash from the steering shaft.

Still another object of this invention is to provide a steering shaft which, when locked to prevent axial movement of the steering wheel, also eliminates side-to-side movement of the steering wheel.

Another object of this invention is to provide a steering shaft which satisfies the above-recited objects while being strong in relation to its weight and size, durable without the need to employ unusually expensive materials of construction, and inexpensive to manufacture considering both the fabrication and assembly of component parts of the shaft.

Accordingly, this invention provides a no-lash telescoping steering shaft comprising an elongate first part defining an axially extending bore therein, said axially extending bore being polygonal in transverse cross section, a second part defining an elongate portion which is slidably received in said axially extending bore for reciprocation along the axis thereof said elongate portion of said second part being polygonal in transverse cross section and substantially coinciding to said polygonal bore to couple said first and said second parts for rotation in unison, and means for frictionally coupling said first and second parts to prevent relative axial motion thereof while eliminating lash from said steering shaft.

An axially movable steering column is known in accordance with the U.S. Pat. No. 3,434,368, entitled No-Lash Axially Movable Steering Column, issued Mar. 25, 1969, to D. E. Runkle, in which the steering column includes a pair of telescoping shafts. One of the shafts is polygonal in cross section. The other shaft is tubular and includes a polygonal bore which coincides with the cross section of the first shaft. The steering wheel is drivingly connected to the one shaft. A steering gear is connected to the other shaft. Consequently, the telescoping shafts are able to rotatably transmit torque between the steering wheel and the steering gear of a vehicle. Additionally, the polygonal inner shaft includes a number of resilient tangs within the bore of the tubular shaft. A wedge member is received between the tangs to force the tangs into frictional engagement with the walls of the polygonal bore. An elongated rod extends through an axial bore in the inner polygonal shaft and carries a lever adjacent the steering wheel. The rod threadably engages the wedge member so that a vehicle operator can engage and disengage the tangs from the walls of the polygonal bore by rotating the elongated rod via the lever. Consequently, the telescoping shafts may be moved relative to one another to axially position the steering wheel according to the drivers preference. Additionally, the shafts may be engaged with each other to maintain a selected axial position for the steering wheel.

With a telescoping steering column of the type illustrated in the Runkle patent, manufacturing of the steering column requires many expensive machining operations. Additionally, the axial dimension of the wedge member is relatively large so that the range of axial motion for the steering wheel is somewhat limited in comparison to the overall length of the steering shaft. A further drawback of the steering shaft invented by Runkle is that while lash is eliminated from the steering column when the shaft is locked to prevent axial motion of the steering wheel, side-to-side motion of the steering wheel, which results from radial clearances between the telescoping shafts, is not eliminated. Of course, such side-to-side wiggle of the steering wheel is objectionable because it may give the vehicle driver the disconcerting impression that the steering wheel is not securely connected to the steering column.

The invention as claimed is intended to avoid one or more of the shortcomings of prior telescoping steering shafts by providing a no-lash telescoping steering shaft characterized by said frictional coupling means including said second shaft part defining an axially extending through bore, said through bore including a tapered section tapering outwardly to an opening on the elongate portion of said second part within said axially extending bore of said first part, an elongate locking part slidably received in said through bore for reciprocation along the axis thereof, said elongate locking part including a tapered portion received in and slidably engaging said tapered through bore section, said elongate locking part further including an axially and radially extending projection defining a radially outer surface slidably engaging and substantially coinciding with a circumferential portion of said polygonal bore of said first shaft part, said radially extending projection extending diametrically oppositely from a substantially V-shaped internal corner defined by said polygonal bore of said first shaft part, and the engagement of said radially extending projection with said polygonal bore of said first part being spaced axially from the engagement of said tapered portion with said tapered through bore section, and means for forcing said tapered portion axially into said tapered through bore section in response to an operator input, whereby said tapered locking part portion cooperates with said tapered bore section to force said radially extending projection into frictional engagement with said polygonal bore to prevent relative axial movement of said first and second shaft parts, reaction forces forcing said second shaft part into said V-shaped corner to eliminate rotational lash and side-to-side relative movement of said shaft parts in a first axial plane, said reaction forces also creating a moment between said shaft parts eliminating side-to-side relative movement of said shaft parts in a second axial plane which is perpendicular to said first axial plane.

The advantages offered by the invention are mainly that a steering column incorporating the invention provides for axial movement of the steering wheel; rotational lash is eliminated from the steering column when the two shaft parts are locked together; side-to-side wiggle of the steering wheel is also eliminated when the shaft is locked; the steering shaft is strong in relation to its size and weight; several of the expensive broaching operations required to manufacture the Runkle invention are not required in the manufacture of this invention; the axial length of the locking mechanism of this invention is relatively small so that the overall length of the shaft may be comparatively short to provide a predetermined range of axial movement for the steering wheel.

One way of carrying out the invention is described in detail below with reference to drawing figures which illustrate only the one preferred embodiment, in which:

FIG. 1 is a side view, partly in cross section, of a steering shaft embodying the invention;

FIGS. 2 and 3 are cross-sectional views taken along the lines 2—2 and 3—3, respectively, of FIG. 1; and FIG. 4 is a fragmentary cross-sectional view taken along the line 4—4 of FIG. 2.

With reference to FIG. 1, a no-lash telescoping steering shaft 10 includes an elongate first part 12 which defines an axially extending bore 14 therein. The axially extending bore 14 is polygonal in transverse cross section, viewing FIGS. 2 and 3. The elongate first part 12 defines an enlarged portion 16 by which the first part is connectable to a steering gear (not shown) of an automotive vehicle (not shown). A second part 18 defines an elongate portion 20 which is slidably received in the axially extending bore 14 of the first part 12 for reciprocation therein. The elongate portion 20 of the second part 18 is also polygonal in transverse cross section and substantially coincides with the polygonal bore 14 of the first part 12. Consequently, the first part 12 and second part 18 are coupled for rotation in unison.

The second part 18 includes an enlarged portion 22 which defines a tapered portion 24, a spline-defining portion 26, and a thread-defining portion 28. The tapered portion 22 cooperates with the elongate portion 20 to define a shoulder 30 which is engageable with the end edge 32 of the first part 12 to limit reciprocation of the second part 18 into the bore 14. The first part 12 defines an annular groove 34 circumscribing the bore 14. A pair of transverse grooves 36 communicate with the floor of the annular groove 34 and transect the bore 14, viewing FIGS. 2 and 4. The elongate portion 20 of the second part 18 defines a pair of axially extending flats 38 which are congruent with the pair of transverse grooves 36. The axially extending flats 38 cooperate with the remainder of the elongate portion 20 to define a pair of abutment surfaces 40, viewing FIG. 4. A C-shaped retaining ring 42 is received in the annular groove 34. The retaining ring 42 defines a pair of legs 44 which are received in the transverse grooves 36. The abutment surfaces 40 of the elongate portion 20 are engageable with the legs 44 to limit reciprocation of the second part 18 out of the bore 14.

A steering wheel 46 includes a rim 48 which is connected to a hub 50 by spokes 52. The hub defines a bore 54 which receives the enlarged portion 22 of the second part 18. The bore 54 defines a tapered portion 56 and a splined portion 58 which engage the taper-defining and spline-defining portions 24 and 26, respectively, of the second part 18 to drivingly connect the steering wheel to the steering shaft 10. A nut 60 threadably engages the thread-defining portion 28 of the second part 18 and also engages the hub 50 to secure the steering wheel to the shaft 10.

In order to lock the first and second parts, 12 and 18, respectively, together to prevent relative axial motion therebetween, the second part 18 defines an axially extending through bore 62. The through bore 62 includes a tapered or conical bore section 64 which tapers axially outwardly to an opening 66 within the bore 14. An elongate locking part 68 is received in the through bore 62. The locking part 68 includes a tapered or cone-shaped portion 70 which is received in and slidably engages the tapered bore section 64. The tapered portion 70 defines an axially and radially extending projection 72. The projection 72 defines a radially outer surface 74 which slidably engages and substantially coincides with a circumferentially extending portion of the polygonal bore 14, viewing FIG. 3. Because of the engagement of the projection 72 with the bore 14, the axis of the conical portion 70 of the locking part 68 is displaced radially from the axis of the through bore 62. As a result, the conical portion 70 slidably engages the tapered bore section 64 diametrically oppositely from the radially extending projection 72. Further, the engagement of the radially extending projection 72 with the bore 14 is spaced axially from the point of engagement of the tapered portion 70 with the tapered section 64 of the through bore 62.

The elongate locking part 68 includes a shank 76 extending from the through bore 62 oppositely from the opening 66. An annular member or nut 78 threadably engages the shank 76. The member 78 defines an annular shoulder 80 which is engageable with an end edge 82 of the second part 18. A lever 84 is carried by and drivingly connected to the nut 78. When the lever 84 is pivoted to rotate the nut 78, the locking part 68 is moved axially relative to the second part 18.

If the lever 84 is pivoted to draw the conical portion 70 into the conical section 64 of the through bore 62, the conical portion 70 slidably cooperates with the conical bore section 64 to move the axis of the conical portion 70 toward the axis of the through bore 62. As a result, the radially extending projection 72 engages the bore 14 and exerts a radially outwardly directed force F thereon, viewing FIG. 1. A radially inwardly directed reaction force G opposes the force F. At the point of engagement of the conical portion 70 with the conical section 64, the conical portion exerts a radially outwardly directed force H. A radially inwardly directed reaction force I opposes the force H. Because the reaction forces G and I are axially spaced apart and act upon the elongate locking part 68 the forces produce a clockwise moment on the locking part. The clockwise moment lies in the plane of FIG. 1 and causes the elongate locking part 68 to be angulated or skewed relative to the axis of the through bore 62. Consequently, the elongate locking part 62 exerts a radially outwardly directed force J upon the second part 18 in the vicinity of the enlarged portion 22 thereof. A radially inwardly directed reaction force K opposes the force J so that the locking part 68 is in equilibrium. Because of the reaction force I, the elongate portion 20 of the second part 18 exerts a radially outwardly directed force L upon the first part 12. A radially inwardly directed reaction force M opposes the force L. Similarly, because of the reaction force K, the elongate portion 20 of the second part 18 exerts a radially outwardly directed force N upon the first part 12. A radially inwardly directed reaction force O opposes the force N. All of the forces F-O lie in the plane of FIG. 1 and sum to zero so that the steering shaft is in equilibrium. Viewing FIG. 1, it will be appreciated that the forces H and J acting upon the second part 18 and being axially spaced apart create a clockwise moment on the second part 18. The clockwise moment on the second part 18 lies in the plane of FIG. 1 and is effective to rotate the second part 18 clockwise in the plane of FIG. 1 relative to the first part 12 to eliminate radial clearances therebetween. The radial clearances between the first part 12 and second part 18 are normally too small to be illustrated. However, the clearances are sufficient to allow a side-to-side wiggle of the steering wheel in the plane of FIG. 1 if they are not eliminated. The clockwise moment on the second part 18 resists counter clockwise rotation of the second part and steering wheel 46 in the plane of FIG. 1 so that wiggle of the steering wheel in this plane is substantially eliminated.

Viewing FIG. 2, it will be seen that the force L urges a V-shaped or cusp-defining external surface 86 on the elongate portion 20 opposite the conical section 64 into a V-shaped internal surface or corner 88 defined on the polygonal bore 14. The force N similarly urges V-shaped external surfaces on the elongate portion 20 into a V-shaped corner of the polygonal bore 14 in the vicinity of the end edge 32 and diametrically opposite the surfaces 86 and 88. The plane of FIG. 1 is indicated in FIGS. 2 and 3 in order to facilitate an understanding of the invention. The V-shaped external and internal surfaces described supra cooperate because of the forces L and N to resist side-to-side wiggle of the steering wheel in an axial plane perpendicular to the plane of FIG. 1. Further, because the force L is of relatively great magnitude, the surfaces 86 and 88 are forced tightly into engagement to virtually eliminate rotational lash from the steering column 10.

It is noted from the foregoing paragraph that the radially extending projection 72 is engageable with a first V-shaped or cusp defining internal surface defined by the bore 14, see FIG. 3 at 73. The external surface 86 of the elongate portion 20 is engageable with a second V-shaped or cusp defining internal surface defined by the bore 14, see FIG. 2 at 88.

An inspection of FIG. 1 will reveal that when a vehicle operator applies an operator input force to the lever 84 to lock the telescoping steering shaft, the operator input force is magnified by the lever arm of the lever 84, by a first inclined plane (the theaded engagement of the nut 60 with shank 76) and by a second inclined plane (the conical portion 70 cooperating with the conical bore section 64). As a result, a relatively small input force can produce a substantial force F to securely lock the first and second parts 12 and 18 together and to eliminate rotational lash and side-to-side wiggle from the steering shaft.

I claim:

1. An axially elongatable shaft comprising first and second elongate parts, one of which is axially movable with respect to the other of said parts, said first part being polygonal or noncircular in transverse cross section, and said second part having a substantially corresponding polygonal or noncircular bore therein for receiving said first part, and axially movable means extending from one end of said first part to an opposite end of said first part, said axially movable means being operatively engageable with said first and second parts for causing a moment therebetween substantially about said first part one end in a first axial plane upon axial movement of said means to thereby resist side-to-side and axial relative movement of said first and second parts in said first axial plane, said moment also urging said axially movable means into engagement with said first part substantially at said opposite end to resist side-to-side movement therebetween.

2. The invention of claim 1 wherein said first part includes a surface which is angulated with respect to the axis of said first part, said axially movable means including mating surface means for engaging said angulated surface to move said axially movable means radially in response to axial movement of the latter, said axially movable means including a radially extending projection slidably and frictionally engaging said bore of said second part at a point which is axially spaced from the point of engagement of said angulated surface and said mating surface means and said point is also axially spaced from said first part.

3. The invention of claim 2 wherein said angulated surface is defined by an axially extending conical bore on said first part, said axially movable means including a cone-shaped portion which is slidably received in said conical bore, said radially extending projection moving said cone-shaped portion radially so that the axis of the latter is displaced from the axis of said conical bore, said cone-shaped portion slidably engaging said conical bore diametrically oppositely from said radially extending projection.

4. The invention of claim 2 wherein said radially extending projection defines a radially outer surface which substantially conforms to a circumferential portion of said bore of said second part.

5. The invention of claim 2 wherein said first part defines axially extending surfaces which intersect to define a substantially V-shaped external corner on said first part, said second part defining axially extending surfaces which intersect to define a V-shaped internal corner on said bore which substantially coincides with said V-shaped external corner, said internal and external corners lying substantially in said first axial plane and diametrically oppositely from said radially extending projection, said moment forcing said V-shaped corners into engagement with one another to substantially eliminate rotational lash from said shaft.

6. A no-lash telescoping steering shaft comprising an elongate first shaft-part derfining an axially extending bore therein, said axially extending bore being polygonal in transverse cross section, a second shaft part defining an elongate portion which is slidably received in said axially extending bore for reciprocation along the axis thereof, said elongate portion of said second part being polygonal in transverse cross section and substantially coinciding to said polygonal bore to couple said first and said second parts for rotation in unison, and means for frictionally coupling said first and second parts to prevent relative axial motion thereof while eliminating lash from said steering shaft, characterized by said frictional coupling means including said second shaft part defining an axially extending through bore, said through bore including a tapered section tapering outwardly to an opening on the elongate portion of said second part within said axially extending bore of said first part, an elongate locking part slidably received in said through bore for reciprocation along the axis thereof, said elongate locking part including a tapered portion received in and slidably engaging said tapered through bore section, said elongate locking part further including an axially and radially extending projection defining a radially outer surface slidably engaging and substantially coinciding with a circumferential portion of said polygonal bore of said first shaft part, said radially extending projection extending diametrically oppositely from a substantially V-shaped internal corner defined by said polygonal bore of said first shaft part, and the engagement of said radially extending projection with said polygonal bore of said first part being spaced axially from the engagement of said tapered portion with said tapered through bore section, and means for forcing said tapered portion axially into said tapered through bore section in response to an operator input, whereby said tapered locking part portion cooperates with said tapered bore section to force said radially extending projection into frictional engagement with said polygonal bore to prevent relative axial movement of said first and second shaft parts, reaction forces forcing said second shaft part into said V-shaped corner to eliminate rotational lash and side-to-side relative movement of said shaft parts in a first axial plane, said reaction forces also creating a moment between said shaft parts eliminating side-to-side relative movement of said shaft parts in a second axial plane which is perpendicular to said first axial plane.

7. The invention of claim 6 wherein said means for forcing said tapered portion axially into said tapered through bore section includes an elongate shank connecting at its one end to said locking part and projecting at its other end from said through bore, and means for co-acting with said shank and second part for moving said shank relative to said second part in response to an operator input.

8. An axially movable steering shaft comprising:
a first elongate part including means at one end thereof for torque-transmitting connection to a steering gear, said first part defining an axial bore opening on the other end thereof, said bore being substantially polygonal in transverse cross section;
a second elongate part including means at one end thereof for carrying and drivingly coupling with a steering wheel, said second part including an elongate portion slidably received in said bore for reciprocation along the axis thereof, said elongate portion being substantially polygonal in transverse cross section and substantially coinciding with said bore to couple said first and second parts for rotation in unison;
said second part defining an axially extending through bore opening on the ends thereof, said through bore including a conical section tapering axially outwardly to the one of said openings within said first part;

an elongate locking piece movably received in said through bore, said locking piece including a conical portion received into and substantially correlating with said conical section of said through bore, said conical portion carrying an axially and radially extending projection;

said axially and radially extending projection defining a radially outer surface slidably engaging and substantially coinciding with a circumferential segment of said polygonal bore of said first part, said circumferential segment of said polygonal bore including at least two axially extending surfaces which are non parallel in transverse cross section, said axially extending surfaces cooperating to define a first internal cusp on said circumferential segment and said projection cooperating with said first cusp to substantially prevent rotation of said locking piece relative to said first part;

said locking piece extending from said through bore at the end thereof opposite from said conical section and defining a threaded portion;

a rotatable member threadably engaging said threaded locking piece portion and engaging said second part, rotation of said rotatable member drawing said conical portion into said conical bore section;

said conical portion slidably engaging said conical bore section diametrically oppositely from and axially spaced from said radially extending projection to provide a radially directed force moving said radially outer surface into frictional engagement with said polygonal bore to prevent relative axial movement of said first and second parts in response to rotation of said rotatable member which draws said conical portion into said conical bore section, the point of engagement of said conical portion with said conical bore section defining a first axial plane in cooperation with the axis of said polygonal bore, said polygonal bore defining a second internal cusp lying substantially in said first axial plane diametrically opposite said first cusp, and radially directed reaction forces moving a corresponding external cusp defined on said second part into engagement with said second cusp to eliminate rotational lash from said steering shaft.

9. The invention of claim 8 wherein said radially directed force and reaction force create a moment on said second part, said moment lying in said first axial plane and moving said second part into engagement with said first part to eliminate side-to-side relative movement thereof in said first plane.

10. The invention of claim 8 or 9 wherein said first and second external cusp lie substantially in said first axial plane, said first and second cusp in response to said moment cooperating with corresponding external cusp defined on said second part to substantially eliminate side-to-side relative movement of said first and second parts in an axial plane which is substantially perpendicular to said first axial plane.

* * * * *